Figure 1:
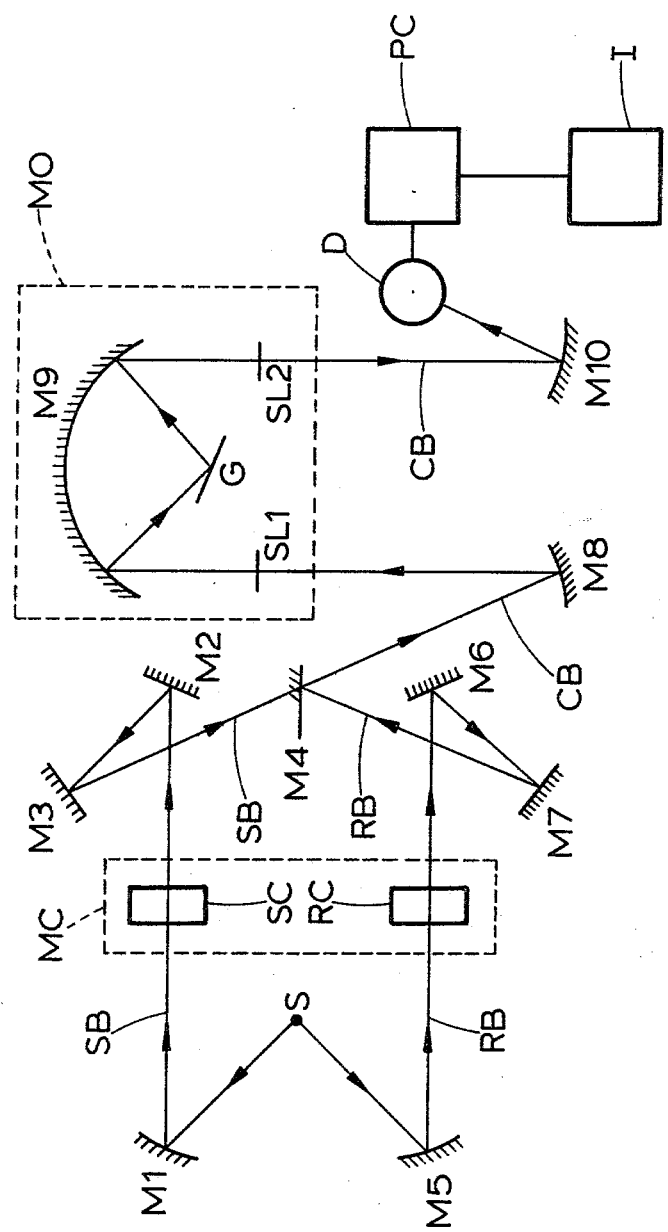

United States Patent [19]

Barlow et al.

[11] 4,299,485
[45] Nov. 10, 1981

[54] SPECTROPHOTOMETER

[75] Inventors: Derek Barlow; Charles V. Perkins, both of Cambridge, England

[73] Assignee: Pye Electronic Products Limited, Cambridge, England

[21] Appl. No.: 125,013

[22] Filed: Feb. 27, 1980

[30] Foreign Application Priority Data

Mar. 5, 1979 [GB] United Kingdom ............... 07616/79
Mar. 5, 1979 [GB] United Kingdom ............... 07618/79

[51] Int. Cl.³ .............................................. G01J 3/42
[52] U.S. Cl. ..................................... 356/307; 356/323
[58] Field of Search ................... 356/307, 319–321, 356/323–325

[56] References Cited

U.S. PATENT DOCUMENTS 3,497,302 2/1970 Tipotsch ............................ 356/325
3,711,708 1/1973 Dolin et al. ..................... 356/325 X
4,030,829 6/1977 Hooper ............................. 356/325

Primary Examiner—F. L. Evans
Attorney, Agent, or Firm—Thomas A. Briody; Robert T. Mayer; Paul R. Miller

[57] ABSTRACT

A dual beam spectrophotometer includes signal processing circuitry for producing sample-dark and reference-dark signals. The dark signals substracted from the sample and reference signals are the average of the dark signals produced on each side of the sample and reference pulses. The signal processing circuitry may comprise four sample and hold circuits which store the sample signal, reference signal and first and second dark signals, a resistive combining network for the two dark signals and first and second substractor circuits. The first substractor circuit provides the sample-dark signal at its output while the second substractor circuit provides the reference-dark signal at its output.

4 Claims, 13 Drawing Figures

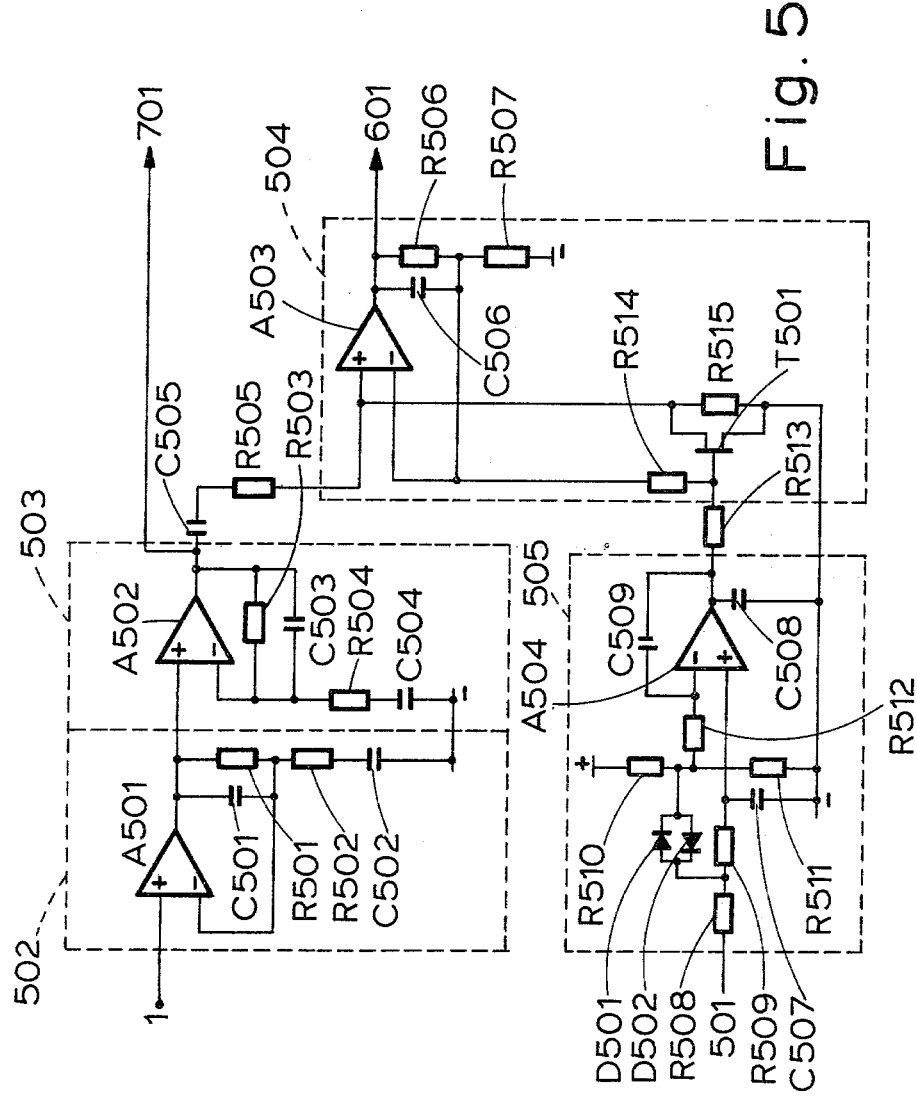

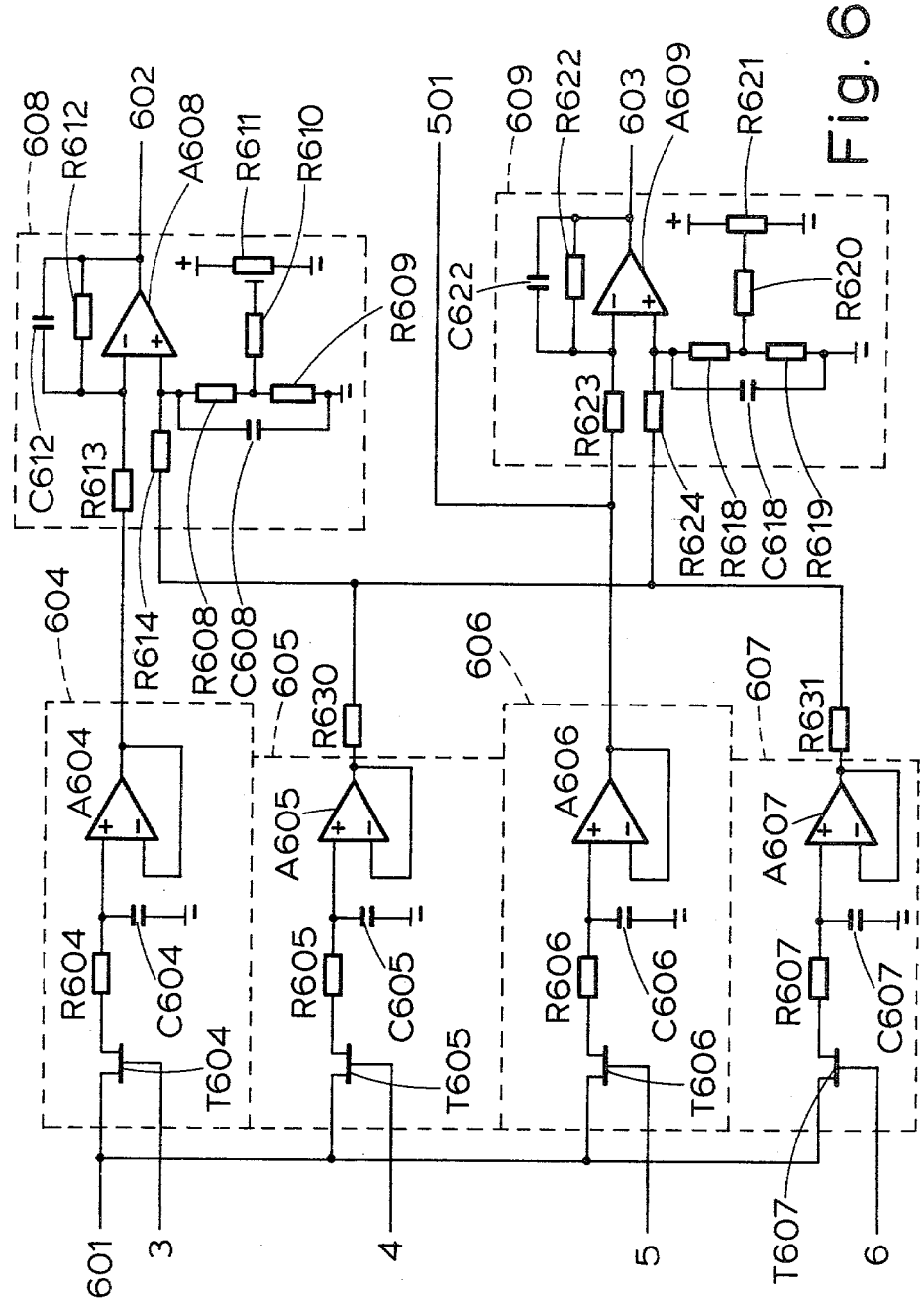

SPECTROPHOTOMETER

This invention relates to dual beam spectrophotometers.

Dual beam spectrophotometers of the ratio recording type, i.e. in which the ratio of the radiation received via a sample path to that received via a reference path is computed to determine the transmittance of a sample substance, include signal processing circuitry for generating from signals produced by a detector a first signal representative of the radiation received by the detector from a radiation source via a first path including a sample cell minus the background radiation and a second signal representative of the radiation received by the detector from the radiation source via a second path including a reference cell minus the background radiation, the radiation received by the detector being in the form of interlaced pulses separated by dark periods in which radiation following the first and second paths is prevented from falling on the detector wherein the detector produces a composite electrical signal representative of the magnitude of the radiation received by the detector.

In such an instrument the radiation received by the detector is in a time division multiplexed form and hence the output of the detector due to background radiation, which is assumed to be the output produced by the detector during the periods during which radiation following the first and second paths is prevented from falling on the detector, is measured at a different time from that during which radiation following the first or second paths is measured. If the magnitude of the background radiation is changing this can give rise to errors in the transmittance value determined. Changes in background level can be caused, for example, when scanning across the infra red range by selective absorption by water vapour in the atmosphere at different wavelengths.

In prior instruments the background radiation (or dark) level has been measured immediately before the radiation received via the first path (or sample level) is measured and subtracted therefrom to give the first (or sample-dark signal). The second (or ref-dark) signal is generated in the same way. The detector is normally a.c. coupled to the processing circuitry and hence the sample-dark and ref-dark signals may be generated by clamping the signal level to earth, or to some other reference potential, during the periods in which radiation via the first and second paths is prevented from falling on the detector (hereinafter called the dark periods). An alternative known circuit for generating the first and second signals comprises three sample and hold circuits which sample the signal produced by the detector during the periods in which the radiation follows the first path (hereinafter called the sample period), in which the radiation follows the second path (hereinafter called the ref period) and the dark periods respectively. The outputs of the sample and hold circuits are connected to the inputs of two subtractor circuits so that the first subtractor circuit produces the sample-dark signal and the second subtractor circuit produces the ref-dark signal. It will be appreciated that with this arrangement, when the level of the background radiation is changing the magnitude of the sample-dark and ref-dark signals will be updated during each dark period i.e. during the dark period on each side of the respective sample or ref period. However, neither circuit will prevent dynamic breakthrough onto the first and second signals produced as a result of rapidly changing background radiation levels.

It is an object of the present invention to provide a spectrophotometer in which the effect of changes in the level of background radiation on the measurement made is reduced.

The present invention provides a dual beam spectrophotometer including signal processing circuitry for generating from signals produced by a detector a first signal representative of the radiation received by the detector from a radiation source via a first path including a sample cell minus the background radiation and a second signal representative of the radiation received by the detector from the radiation source via a second path including a reference cell minus the background radiation, the radiation received by the detector being in the form of interlaced pulses separated by dark periods in which radiation following the first and second paths is prevented from falling on the detector wherein the detector produces a composite electrical signal representative of the magnitude of the radiation received by the detector characterised in that the signal produced by the detector during successive dark periods is averaged and that the average value is subtracted from the signals produced by the detector when the radiation is received via the first and second paths to produce the first and second signals respectively. The average may be taken over two dark periods.

Averaging the signal produced during successive dark periods reduces the effect of changes in background radiation level on the measurements made and also provides a reduction in the non-linearity of transmittance measurements when the detector is a.c. coupled to the signal processing circuitry or has a low frequency thermal time constant. This applies to typical detectors for infra-red radiation such as pyroelectric or Golay pneumatic detectors.

The signal processing circuitry may comprise four sample and hold circuits, the first storing a signal representative of the radiation received via the first path, the second storing a signal representative of the radiation received via the second path and the third and fourth storing signals representative of the radiation received during successive dark periods, means for averaging the output of the third and fourth sample and hold circuits, a first subtractor having a first input connected to the output of the first sample and hold circuit and a second input connected to the output of the averaging means, and a second subtractor having a first input connected to the output of the second sample and hold circuit and a second input connected to the output of the averaging means, the outputs of the first and second subtractors being the first and second signals respectively.

Figure 2:
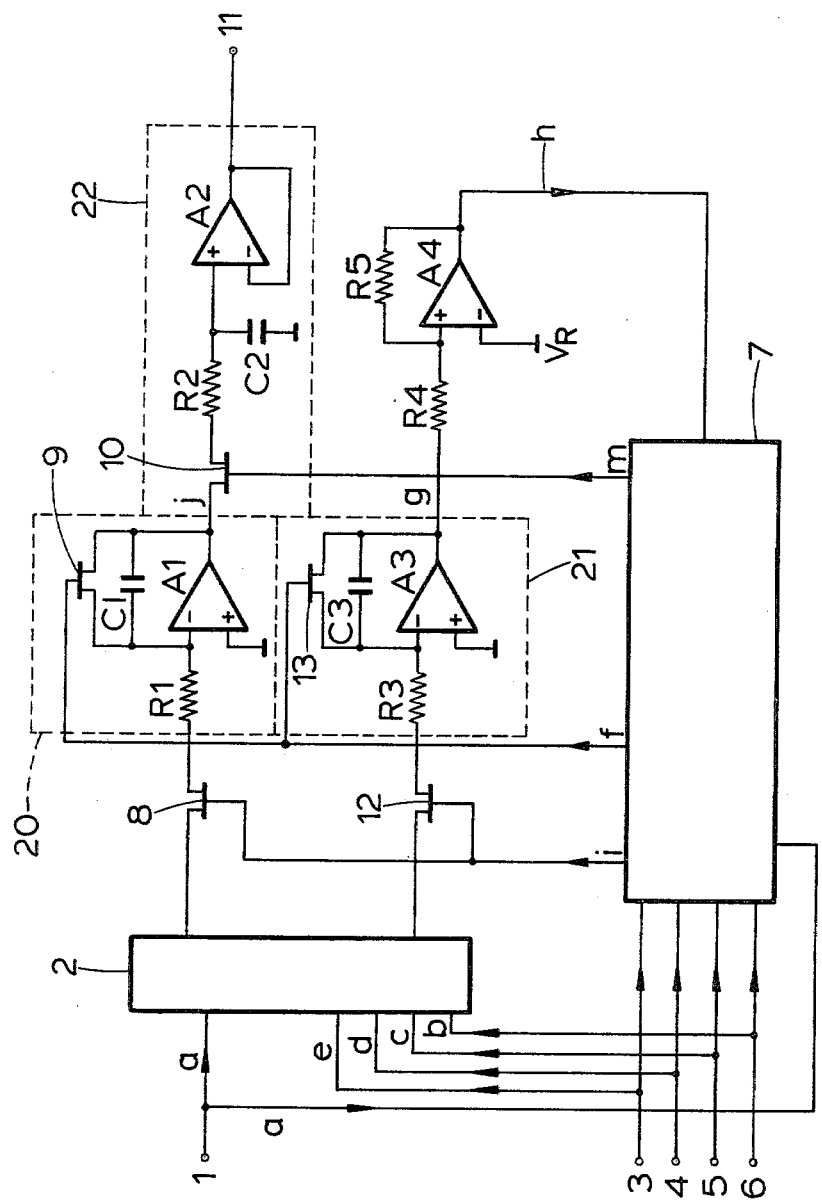
Figure 3:
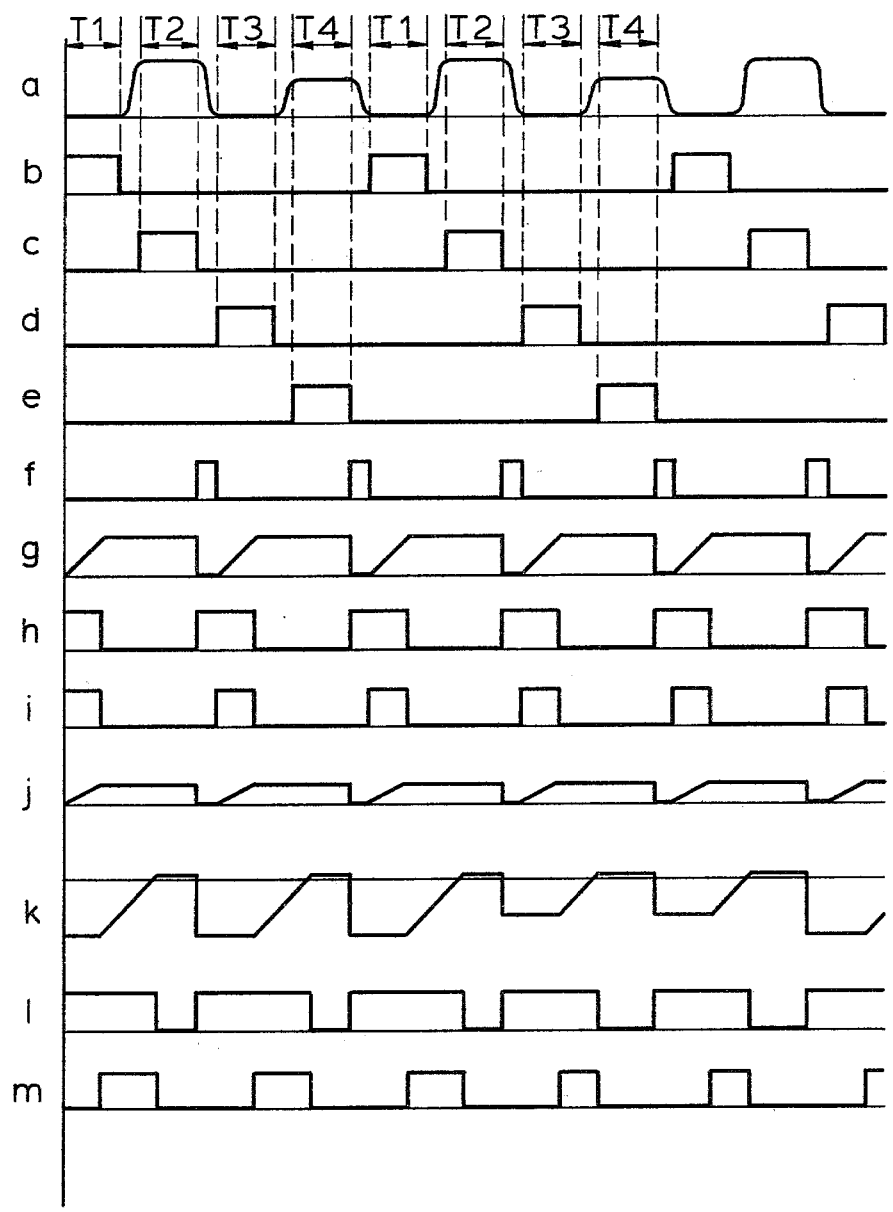
Figure 4:
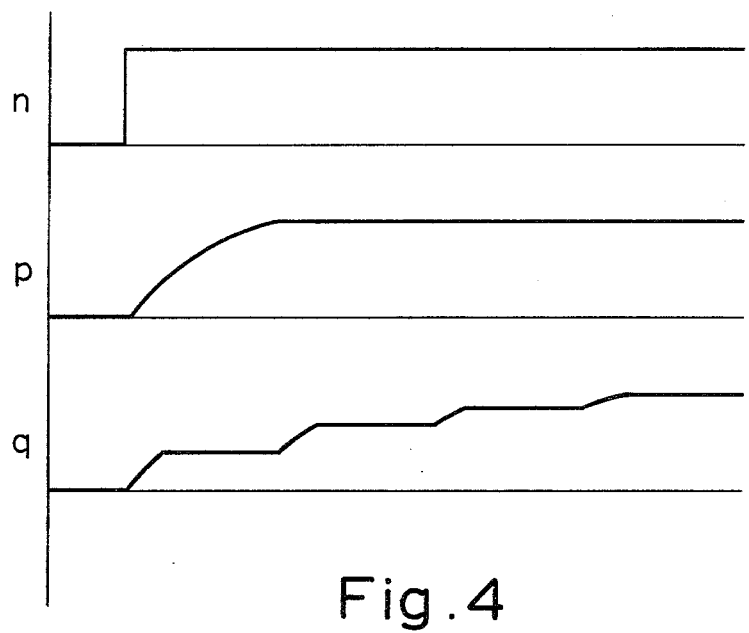
Figure 9:
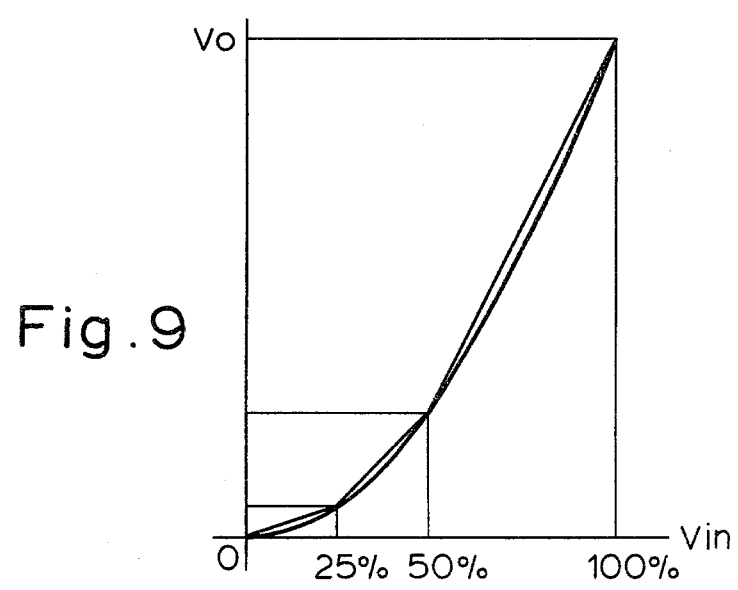
Figure 7:
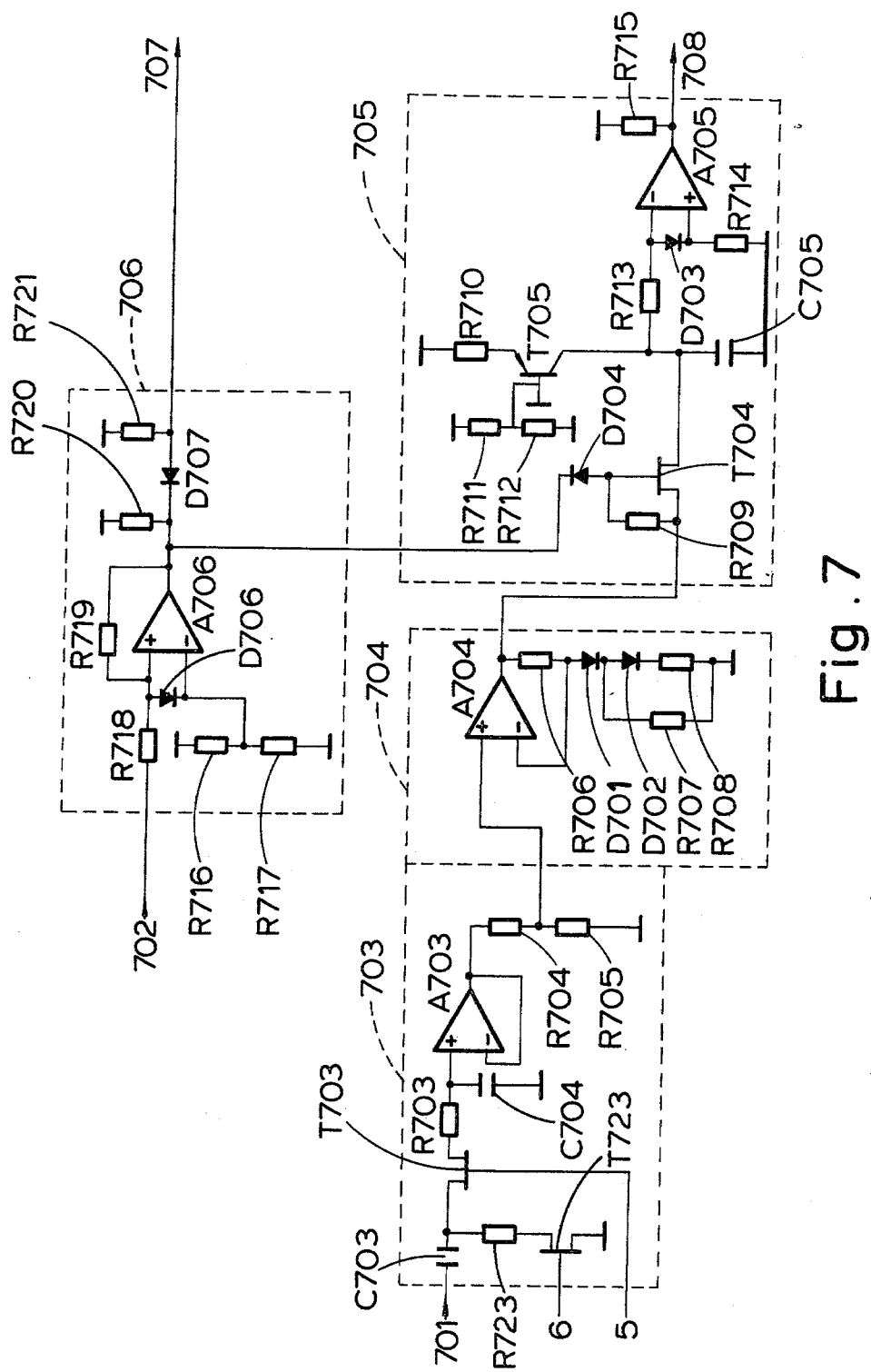
Figure 8:
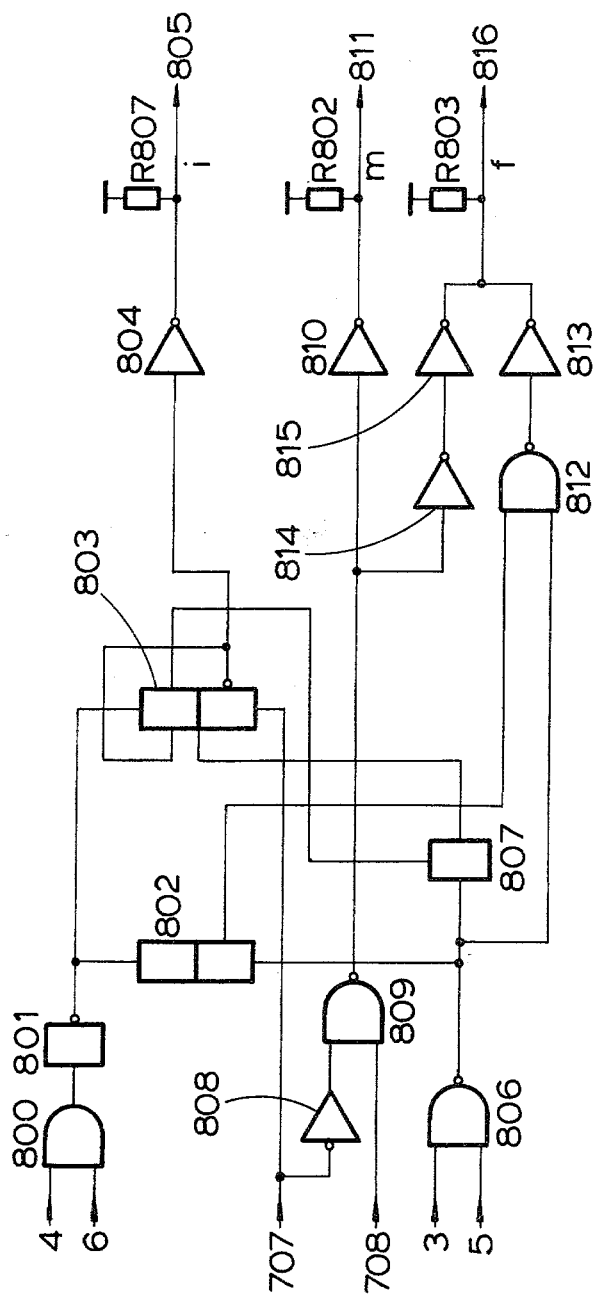
Figure 10:
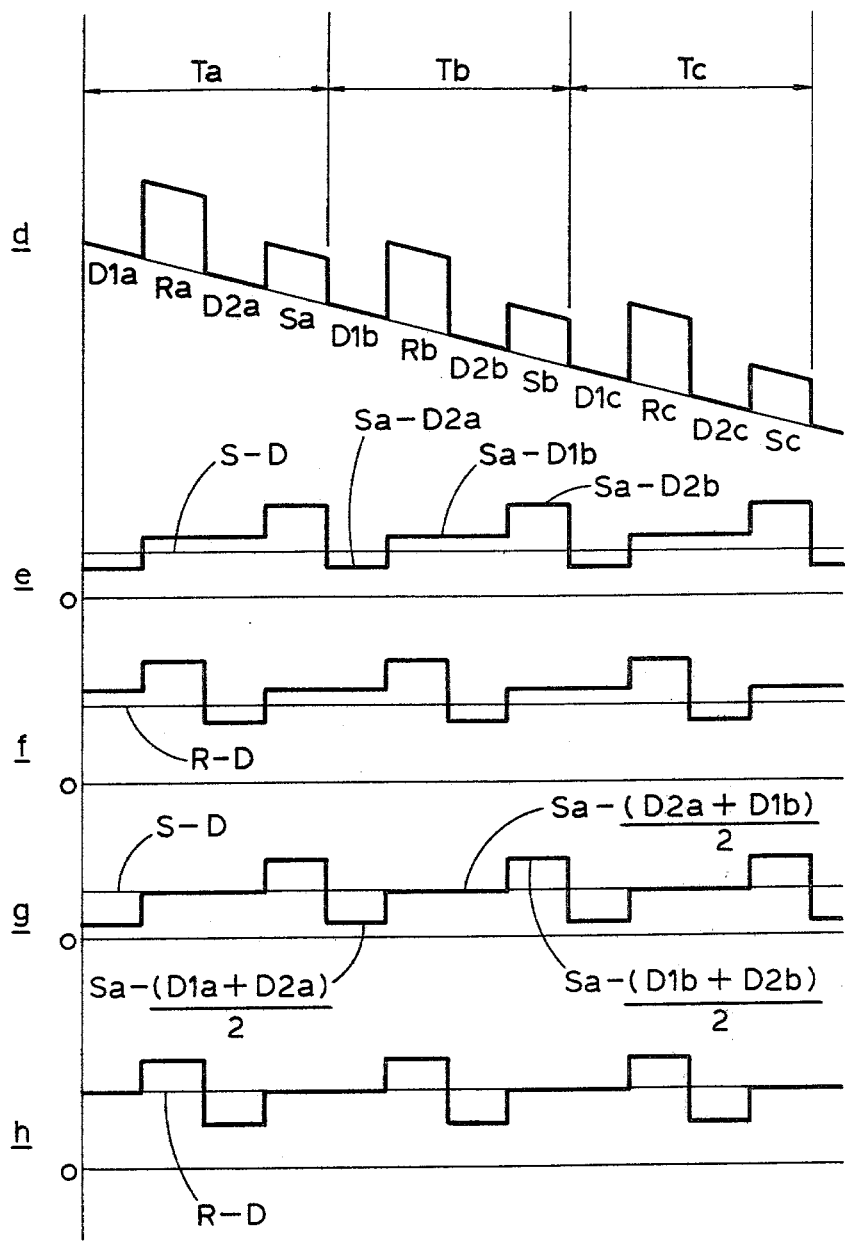
Figure 11:
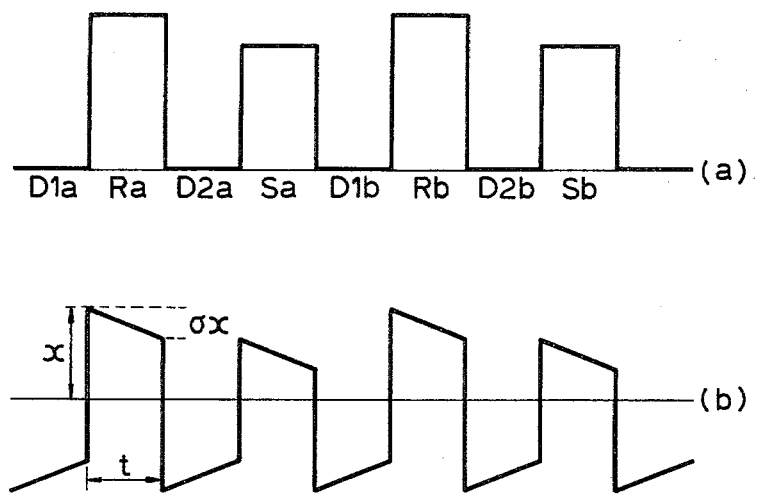
Figures 12, 13:
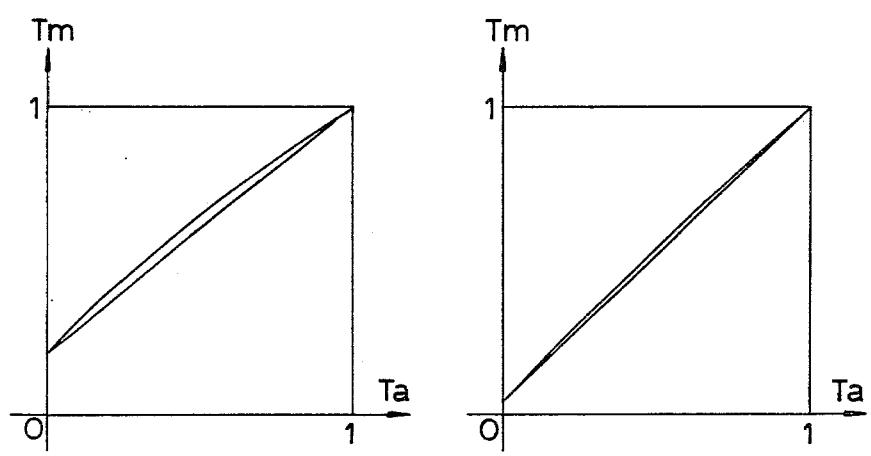

An embodiment of the invention will now be described, by way of example, with reference to the accompanying drawings, in which:

FIG. 1 shows in diagrammatic form a dual beam spectrophotometer according to the invention, FIG. 2 shows a signal processing circuit for use in the spectrophotometer of FIG. 1, FIG. 3 shows a series of waveforms illustrating the operation of the processing circuit of FIG. 2, FIG. 4 illustrates the response of the sample and hold circuit of FIG. 2 to a step input, FIG. 5 shows an amplifier for insertion between the radiation detector and an input of the circuit of FIG. 2, FIG. 6 shows in greater detail the decoding circuit of FIG. 2, FIGS. 7 and 8 show in greater detail the control logic circuit of FIG. 2, FIG. 9 shows the response of a squaring circuit in the control logic circuit, FIG. 10 illustrates the response of various processing circuits to a composite signal produced when the level of the background radiation is varying, FIG. 11 illustrates the response of certain detectors to the radiation falling on them, FIG. 12 is a graph of measured transmittance against actual transmittance when using prior art processing circuitry, and FIG. 13 is a graph of measured transmittance against actual transmittance when using the circuit of FIG. 6.

The spectrophotometer shown in FIG. 1 comprises a source of radiation S, means for forming two beams of radiation, means for combining the two beams, a monochromator MO, a detector D and signal processing means PC.

Radiation from source S, which may be in the infrared, visible or ultra violet regions of the spectrum, is reflected by a mirror M1 along the path SB which passes through a sample cell SC within a measurement compartment MC. The radiation following path SB is reflected by two further mirrors M2 and M3 onto a rotating sector mirror assembly M4 which alternately allows the radiation following the path SB to fall on a mirror M8 or reflects it away from the mirror M8. Radiation from source S is also reflected by a mirror M5 along a second path RB which passes through a reference cell RC, which is also located in the measurement compartment MC. The radiation following path RB is reflected by two further mirrors M6 and M7 onto the rotating sector mirror assembly M4 which alternately reflects the radiation following the path RB onto the mirror M8 or allows it to pass through and thus be directed away from the mirror M8. Thus a composite beam CB which comprises pulses of radiation which have followed path SB interlaced with pulses of radiation which have followed path RB is formed. The rotating mirror M4 has successive sectors which are radiation transparent, radiation absorbing, radiation reflective and radiation absorbing in series thus causing the composite beam CB to comprise interlaced pulses of radiation which have followed paths SB and RB respectively separated by periods in which radiation from the source is interrupted. The composite beam CB is reflected by mirror M8 onto an entrance slit SL1 of a monochromator MO. The monochromator MO comprises the entrance slit SL1, a concave mirror M9, a diffraction grating G and an exit slit SL2 and is used to select radiation of a narrow band of wavelengths from the wideband radiation presented to the entrance slit SL1. The narrow band radiation emerging from the exit slit SL2 is reflected onto a detector D by a mirror M10. The output of the detector D is fed via signal processing means PC to an indicator I.

In order to determine the transmittance of a sample it is inserted in the measurement compartment MC so as to be traversed by the sample beam and the signal processing means PC is arranged to determine the ratio of the magnitude of the radiation emerging from the sample cell SC to that emerging from the reference cell RC. If the magnitude of the radiation emitted from the source S is small then the signal produced at the output of the detector D will be small and hence the effect of noise in the system will be increased. Since the total noise produced at the output of the signal processing means PC is proportional to the square root of its bandwidth the effect of the noise can be reduced by reducing the bandwidth as the magnitude of the radiation reaching the detector D via path RB is reduced. This procedure may also be expressed as increasing the response time of the signal processing means PC as the magnitude of the radiation is reduced. It will be appreciated that this increase in the response time, or decrease in bandwidth, will prevent the system responding to fast changes in the level of radiation emerging from the sample cell SC and will thus limit the rate of change of wavelength produced by the monochromator MO if meaningful measurements are to be made.

Further since the radiation directed by the detector D during the sample period will be that caused by the radiation from the source which passes through the sample cell plus that due to the background radiation, in order to produce a signal which is due solely to the radiation passing through the sample cell and falling on the detector it is necessary to subtract the dark signal from the sample signal. Similarly the dark signal has to be subtracted from the ref signal before the transmittance, which is the ratio of the sample to the ref signal, can be determined. Thus the signal processing means PC further includes circuitry to perform the necessary subtraction and ratioing.

The signal processing means still further includes means for averaging the dark signal produced on both sides of the respective sample or ref signal and uses the averaged signal as the dark signal to be subtracted from the sample or ref signal. This reduces the breakthrough of changing dark signal magnitude onto the sample or ref signals. A further advantage of averaging the dark signals occurring on each side of the sample or ref period is that it reduces the non-linearity of the transmittance signal when the detector is a.c. coupled to the signal processing means or when the detector itself is an a.c. device.

The indicator I is typically a chart recorder in which the chart is advanced in synchronism with the wavelength change of the monochromator. However, other indicators could be used, for example video display units or the output of the signal processing means could be fed to a computer which could either store the information or drive a printer to produce a print out of transmittance against wavelength.

FIG. 2 shows in block schematic form one embodiment of a processing circuit suitable for use in the spectrophotometer of FIG. 1. The signal from the detector D is applied via a terminal 1 to a first input of a decoder 2 and to a first input of a control logic circuit 7. Four timing signals derived from devices sensing the position of the rotating mirror assembly M4 are applied via terminals 3, 4, 5 and 6 to further inputs of the decoder 2 and of the control logic circuit 7. The decoder 2 has a first output which is connected via an FET 8 to an integrator 20 which comprises a resistor R1, capacitor C1 and an operational amplifier A1. An FET 9 is connected across the capacitor C1. The output of the integrator 20 is fed to a sample and hold circuit 22 comprising an FET 10, a resistor R2, a capacitor C2 and an operational amplifier A2 the output of which is connected to an output terminal 11 of the processing circuit. A second output of the decoder 2 is connected via an FET 12 to a second integrator 21 which comprises a resistor R3, a capacitor C3 and an operational amplifier A3. An FET 13 is connected across capacitor C3. The output of the second integrator 21 is connected to one input of a comparator circuit which comprises resistors R4 and R5 and a fast comparator A4. The other input of the comparator is connected to a reference potential VR. The output of the comparator is connected to a further input of the control logic circuit 7. The control logic circuit has three outputs the first being connected to the gate electrodes of FET's 8 and 12, the second to the gate electrode of FET's 9 and 13 and the third to the gate electrode of FET 10.

FIG. 3 shows a number of the waveforms occuring at various points in the processing circuit shown in FIG. 2. Waveform a illustrates the composite waveform from the detector D which is applied at terminal 1. The four time periods T1, T2, T3 and T4 correspond to a first period when the radiation beam is absorbed within the mirror system, a period during which the radiation beam passes through the reference cell before falling on the detector D, a second period during which the radiation beam is absorbed within the mirror system, and a period during which the radiation beam passes through the sample cell before falling on the detector respectively. Waveforms b, c, d and e illustrate the four timing signals applied to the decoder 2 and control logic 7 and which correspond to the periods T1 to T4. Using these timing signals the decoder presents at its first output a signal hereinafter called Sample-Dark representing the detector output during the period T4 minus the average of that during the latest of periods T1 and T3 and at its second output a signal hereinafter called Ref-Dark representing the detector output during the period T2 minus the average of that during the latest of periods T1 and T3. During the periods between the end of T2 and the beginning of T3 and the end of T4 and the beginning of T1 the control logic 7 produces a signal shown as waveform f. This signal is applied to the gate electrodes of FET's 9 and 13 to discharge capacitors C1 and C3 and thus reset the two integrators. At the start of periods T1 and T3 the control logic 7 produces an output signal shown as waveform i which allows the integrators 20 and 21 to integrate the first and second outputs of the decoder 2 respectively. The integrator 21 integrates the Ref-Dark signal and when its output shown by waveform g reaches the reference potential VR causes the comparator output to change as shown by waveform h. This in turn causes the control logic to terminate the integrate pulse i and thus the integrator 20 whose output is shown by waveform j now holds a representation of the Sample-Dark signal as a proportion of the Ref-Dark signal. The control logic 7 generates a waveform m which switches on the FET 10 to connect the output of integrator 20 to the sample and hold circuit 22. The sample pulse of the waveform m commences at the cessation of the integrate pulse, waveform i, and has a pulse length dependent on the magnitude of the output of the detector during the period T2 i.e. the magnitude of the radiation reaching the detector D via the path RB. As this magnitude increases the sample time increases and thus the signal at output 11 follows variations in the magnitude of received radiation more quickly.

Since the noise output of a system is proportional to the square root of the bandwidth it is convenient to make the sample time proportional to the square of the signal energy. Thus noise x bandwidth remains constant. In order to achieve a sample time which is proportional to the square of the signal energy the control logic circuit 7 includes a squaring circuit which squares the signal at the detector D during the period T2. The control logic circuit 7 then uses this value to determine the length of the pulses m and thus the sample time for the sample and hold circuit 22.

FIG. 4 illustrates the response of the sample and hold circuit 22 to a step input shown as waveform n. If the FET 10 is permanently on then the output at terminal 11 will have the form shown as waveform p the response time depending on time constant CR of resistor R2 and capacitor C2. However, if FET 10 is switched on for 25% of the time CR then the output at terminal 11 will have the form shown as waveform q. Clearly, in this case, the rate at which the output of the sample and hold circuit 22 will follow changes in the value of the signal at its input is dependent on the time during which the FET 10 is switched on.

An amplifier as shown in FIG. 5 is connected between input terminal 1 and the decoder 2 and control logic circuit 7. The amplifier includes a pre-amplifier section 502 comprising an operational amplifier A501, a capacitor C501, resistors R501, R502 and a capacitor C502. Following the preamplifier section 502 is a differentiator 503 comprising an operational amplifier A502, resistors R503, R504 and capacitors C503, C504. The output of the differentiator 503 is fed via a line 701 to the control logic circuit 7 and via a capacitor C505 and a resistor R505 to a variable attenuator and buffer stage 504. The variable attenuator and buffer stage 504 includes an operational amplifier A503, a capacitor C506 and resistors R506, R507 and produces an output signal on line 601 which is fed to the decoder 2. The variable attenuator and buffer stage is controlled by an automatic gain comparator and amplifier stage 505 which is fed from an output of the decoder on line 501. The signal on line 501 is fed via the series arrangement of two resistors R508, R509 to the positive input of an operational amplifier A504. A potential divider comprising resistors R510, R511 connected between positive and negative supply rails has the junction of the resistors connected via a resistor R512 to the negative input of the operational amplifier A504. Two oppositely poled diodes D501, D502 are connected in parallel between the junction of resistors R508, R509 and the junction of resistors R510, R511. The output of operational amplifier A504 is fed via resistors R513, R514 to the negative input of operational Amplifier 503. The junction of resistors R513, R514 being connected to the gate electrode of an FET T501. The source and drain electrode of the FET T501 are connected across a resistor R515 which is connected between the negative supply rail and the positive input of amplifier A503. A capacitor C507 is connected between the positive input of amplifier A504 and the negative supply rail, capacitor C508 is connected between the output of amplifier A504 and the negative supply rail, and a capacitor C509 is connected between the output and the negative input of amplifier A504. The variable attenuator and buffer stage is controlled by the automatic gain comparator and amplifier stage to maintain the Ref-Dark signal substantially constant despite variations in the signal level received by the detector D.

The waveforms of FIG. 10 illustrate the response of the processing circuitry to a composite signal having a negative going drift which may be due, for example, to changing level of background radiation.

With the first type of prior art system discussed hereinbefore the dark signal level is established during the dark periods immediately prior to the respective sample and ref periods and subtracted from the sample and ref signal levels established in the respective periods to produce the sample-dark and ref-dark signals. Thus in a period Ta as shown in waveform d the ref-dark signal will be given by Ra−D1a and the sample-dark signal by Sa−D2a, where Ra is the ref signal level during period Ta, Sa is the sample signal level during period Ta, D1a is the first dark signal level during period Ta and D2a is the second dark signal level during period Ta. However, with the background radiation level drifting as shown in waveform d the true dark signal levels would be (D1a+D2a)/2 and (D2a+D1b)/2 and thus the true ref signal level would be Ra−(D1a+D2a)/2 and the true sample signal level would be Sa−(D2a+D1b)/2. With the negative going drift shown in waveform d D1a will be more positive than (D1a+D2a)/2 and D2a will be more positive than (D2a+D1b)/2 and hence the ref-dark and sample-dark signals computed will be less than the true values by an amount dependent on the rate of drift of the background radiation level. Conversely the ref-dark and sample-dark signals will be greater than the true level if the background radiation drifts in a positive direction.

Waveforms e and f illustrate the response of the second type of prior art circuit referred to hereinbefore. In this case the sample-dark and ref-dark signals are not only defined at the end of the ref and sample periods but are modified when each dark signal level is established. Thus for the sample-dark signal illustrated as waveform e during period Tb the sample-dark signal has the value Sa−D2a during the first dark period, Sa−D1b during the ref and second dark periods and Sa−D2b during the sample period. This waveform can be filtered to give a substantially constant output but as can be seen from waveform e it is not symmetrical about the true sample-dark level S−D. The ref-dark signal is shown as waveform f and varies in the same way as the sample-dark signal. Thus with this circuit the computed sample-dark and ref-dark signals will be greater than the true value if the background radiation drifts in a negative direction and smaller than the true value if background radiation drifts in a positive direction.

Waveforms g and h show the response of a processing circuit n which the dark signal level during two successive dark periods is averaged and subtracted from the ref or sample signal. The computed values for the sample-dark signal, shown as waveform g during the period Tb are Sa−(D1a+D2a)/2 for the first dark period, Sa−(D2a+D1b)/2 for the ref and second dark periods and Sa−(D1b+D2b)/2 for the sample period. The average value over the period Tb is therefore equal to [Sa−(D1a+D2a)/2+2[Sa−(D2a+D1b)/2]+Sa−(D1b+D2b)/2]/4=Sa−¾(D1b+D2a)/2−¼(D1a+D2b)/2.

Thus the dark signal level is defined mainly by the average of the dark signal levels during the dark periods on either side of the sample period but with an additional component of one third of the significance due to the dark signal levels next furthest away from the sample period. A similar result applied to the ref-dark signal which is shown as waveform h.

FIG. 11 shows a composite waveform which is either a.c. coupled to the processing circuitry or results from a detector such as a pyroelectric or Golay pneumatic detector such as are commonly used in Infra-Red Spectrophotometers. FIG. 11a shows the energy received by the detector and FIG. 11b the resulting signal coupled to the processing circuit. The droop $\sigma x$ on each level is proportional to the signal magnitude (x) about its means level and is given approximately by $t/\tau$, where $\tau$ is the a.c. coupling time constant or the low frequency thermal time constant of an infra-red detector, provided that $\tau > t$. To obtain a good noise filtering characteristic it is necessary to take the mean level of the signal over as long a period as possible, ideally the whole of the ref or sample period, rather than establish instantaneous values. If the measured transmittance is computed as (Sa−D2a)/(Ra−D1a), where Sa, Ra, D1a, D2a are the mean signal levels during the respective sample reference and dark periods, as will be the case with the first prior art circuit and if $\sigma \leq$ a few % then the measured transmittance will be given by $Tm = Ta + (\sigma/4)(1-Ta^2)$, where Tm is the measured transmittance and Ta is the actual transmittance.

As can be seen from FIG. 12 this will give a zero offset of $\sigma/4$ and a maximum deviation from linearity of $\sigma/16$ when Ta=½. If $\sigma = 5\%$ then $\sigma/4 = 1.25\%$ and $\sigma/16 = 0.31\%$.

If however the measured transmittance is computed as $$\frac{Sa - (D1b + D2a)/2}{Ra - (D1a + D2a)/2}$$

then the measured transmittance will be given by $Tm = Ta + (1-Ta^2)\sigma^2/8$.

As can be seen from FIG. 5 this gives a zero offset of $\sigma^2/8$ and a maximum deviation from linearity of $\sigma^2/32$. If $\sigma = 5\%$ this gives a zero offset of 0.31% and a maximum deviation from linearity of 0.0078%.

Thus a significant improvement in linearity and in the offset of the measured transmittance from the actual value can be achieved by averaging the dark signal levels during the dark periods on each side of the respective sample and reference periods.

FIG. 6 illustrates the decoder 7 in which this averaging may be performed. The processing circuitry comprises four sample and hold circuits 604, 605, 606 and 607 and two subtractor circuits 608 and 609.

Sample and hold circuit 604 comprises an FET T604, a resistor R604, a capacitor C604 and an operational amplifier A604, sample and hold circuit 605 comprises an FET T605, a resistor R605, a capacitor C605 and an operational amplifier A605, sample and hold circuit 606 comprises an FET T606, a resistor R606, a capacitor C606 and an operational amplifier A606 and sample and hold circuit 607 comprises an FET T607, a resistor R607, a capacitor C607 and an operational amplifier A607.

The subtractor circuits 608 and 609 are identical in form, subtractor 608 comprising an operational amplifier A608 having its positive input biased by a resistor network comprising resistors R608, R609, R610 and R611, a capacitor C608 being connected across resistors R608 and R609. The parallel arrangement of a resistor R612 and a capacitor C612 is connected between the output and the negative input of amplifier A608. A first input of subtractor 608 is connected via a resistor R613 to the negative input of amplifier A608 while a second input is connected via a resistor R614 to the positive input of amplifier A608. Subtractor 609 is identical in form and comprises resistors R618–R623, capacitors C618 and C622 and operational amplifier A609.

The composite waveform a is applied on line 601 to the sample and hold circuits 604–607 after suitable processing in the amplifier shown in FIG. 5. Timing signals e, d, c and b are fed from terminals 3, 4, 5 and 6 respectively to sample and hold circuits 604–607. In this way during time period T1 i.e. the first dark period sample and hold circuit 607 samples the composite waveform as the timing signal b causes FET 607 to conduct and stores the magnitude of the composite waveform at that time on capacitor C607. In this way a representative of the radiation falling on the detector D during the first Dark period i.e. a period when the radiation beam is deflected away from the detector D is stored. In the same way the value of the Reference signal is stored on capacitor C606, the sample signal on C604 and the signal during the second Dark period on capacitor C605. The outputs of sample and hold circuits 605 and 607 are commoned through resistors R630 and R631 so that the average value of the composite signal during the last two Dark periods is applied to one input of each of the subtractors 608 and 609. The output of sample and hold circuit 604 is applied to the other input of subtractor 608 which the output of sample and hold circuit 606 is applied to the other input of subtractor 609 and via line 501 to the automatic gain comparator and amplifier 505 (FIG. 5).

The output of subtractor 608 on line 602 provides the Sample-Dark signal which is applied to the input of integrator 20 (FIG. 2) under the control of the integrate signal i as previously described while the output of subtractor 609 on line 603 provides the Ref-Dark signal which is applied to integrator 21 (FIG. 2) also under the control of the integrate signal i.

Thus subtractor 608 has the latest sample signal applied to its first input and the average of the last two dark signals applied to its second input while subtractor 609 has the latest ref signal applied to its first input and the average of the last two dark signals applied to its second input. The output of subtractor 608 on terminal 602 will consequently be as shown in FIG. 3 as waveform g and that of subtractor 609 on terminal 603 that shown as waveform h. Appropriate filtering can be applied to these waveforms and the ratio taken to produce the transmittance value.

The control logic circuit 7 is shown in detail in FIGS. 7 and 8 and comprises an energy level detector 703, a squaring circuit 704, energy level comparator 705 and the logic elements shown in FIG. 8. A comparator 706 is also shown in FIG. 7 and this takes the place of the comparator shown in FIG. 2.

The energy level detector 703 has an input which is connected via line 701 to the output of the differentiator 503 (FIG. 5) and comprises a sample and hold circuit with FET T703, resistor R703, capacitor C704 and operational amplifier A703.

The sample and hold circuit is fed via a capacitor C703 and the FET T703 is switched by waveform c so that a representation of the magnitude of the radiation falling on the detector during the period T2 is held. A resistor R723 and FET T723 are connected in series between the junction of capacitor C703 and FET T703 and the negative supply rail. The gate of FET T723 is fed with waveform b to discharge capacitor C703 before the period T2. The output of the sample and hold circuit is connected via the series arrangement of two resistors R704 and R705 to the negative supply rail. The junction of resistors R704 and R705 forms the output of the energy level detector 703 and is connected to a squaring circuit 704.

The squaring circuit 704 includes an operational amplifier A704 whose positive input is connected to the junction of resistors R704 and R705. The output of amplifier A704 is connected to its negative input via a resistor R706. The series arrangement of two diodes D701 and D702 and a resistor R708 is connected between the negative input of the amplifier A704 and the negative supply rail. The junction of diodes D701 and D702 is connected to the negative supply rail via a resistor R707.

The squaring circuit has unity gain until diode D701 starts to conduct i.e. when the input voltage becomes greater than about 625 mV. The gain is then defined by (R706+R708)/R708 which is made to be equal to three. When the input voltage reaches 1.25 V diode D702 starts to conduct and the gain is defined by the expression $$\left(R706 + \frac{R707 \times R708}{R707 + R708}\right) \bigg/ \left(\frac{R707 \times R708}{R707 + R708}\right)$$

which is made equal to six. FIG. 9 illustrates the response of the squaring circuit to an input signal which ranges between 0 and 2.5 volts. The response is a straight line approximation which is correct at 25%, 50% and 100% of the maximum input signal. In practice at each of the diode break points the curve is smoothed by the gradual turn-on of the diodes. The output voltage of the squaring circuit $\simeq 1.6$ (Vin)$^2$.

The energy level comparator 706 comprises a constant current source for charging a capacitor C705, a comparator and a switch controlled by a reference level comparator 706 which is in modified form the reference level comparator of FIG. 2. The constant current source comprises a pnp transistor T705, having its emitter connected to the positive supply rail via a resistor R710 and its base connected to a potential divider comprising a resistor R711 and a preset potentiometer R712 connected between the positive and negative supply rails. The junction of the collector of transistor T705 and the capacitor C705 is connected via a resistor R713 to the negative input of a fast comparator A705, which together with its associated components, i.e. diode D703 and resistors R714 and R715, forms a comparator. A switch comprising an FET T704 connects the output of the squaring circuit 704 to the junction of capacitor C705 and the collector of transistor T705. The FET T704 is controlled by the output of the reference level comparator 706 via a diode D704 and a resistor R709.

The reference level comparator 706 comprises an operational amplifier A706 having its negative input connected to a potential divider comprising two resistors R716 and R717 connected between the positive and negative supply rails. A resistor R718 is connected between an input line 702 which is connected to the output of the reference integrator 21 and the positive input of amplifier A706. A diode D706 is connected between the positive and negative inputs of amplifier A706 while a resistor R719 is connected between its positive input and its output. The output of amplifier A706 is connected to the positive supply rail via a resistor R720 and via a diode D707 to an output line 707. The output line 707 is connected to a positive supply rail via a resistor R721.

In operation the energy level detector 703 samples the magnitude of the composite waveform a during the period T2 and holds this value on capacitor C704 and thus presents a signal representing the magnitude of the radiation passing through the reference cell to the input of the squaring circuit 704. The output of the squaring circuit is applied to the energy level comparator via the FET T704 which is controlled by the output of the reference level comparator 706 so that the capacitor C705 is discharged to produce a negative voltage proportional to the square of the magnitude of the radiation passing through the reference cell at the junction of capacitor C705 and resistor R713 when the reference comparator output is positive. When the reference comparator output goes negative FET T704 is switched off and the capacitor is charged linearly by the constant current source. This action is illustrated by waveform k in FIG. 3. Waveform k causes the output of comparator A705 to take the form shown in FIG. 3 as waveform 1. As can be seen from FIG. 3 the mark/space ratio of waveform 1 depends on the magnitude of the output of the squaring circuit 704. The output of the comparator A705 is modified in the control logic circuit 7 as described hereinafter to produce the control signal for sample and hold circuit 22 of FIG. 2.

FIG. 8 shows an arrangement of logic circuitry for producing the waveforms i, f, and m of FIG. 3. Inputs 4 and 6 are connected to the inputs of an OR gate 800 whose output is connected to the input of a monostable multivibrator 801. Thus the leading edge of the pulses corresponding to times T1 or T3 will cause the monostable vibrator 801 to produce a pulse which sets two bistable circuits 802 and 803. The Q output of bistable circuit 803 is connected via an invertor 804 to output line 805 and produces the waveform i to govern the operation of the integrators 20 and 21 of FIG. 2. The bistable circuit 803 is reset either when the reference comparator output on line 707, which is connected to the reset input of bistable circuit 803, goes negative, i.e. the reference integrator 21 output has reached a preset value, or at the end of the next T2 or T4 period. Inputs 3 and 5 are connected to the inputs of a NOR gate 806 whose output is connected to the input of a monostable multivibrator 807. The output of the monostable multivibrator 807 is connected to the clock input of bistable circuit 803 and thus the back edge of waveform c or e will cause the bistable circuit 803 to change state. Thus either the end of period T2 or T4 or the output of integrator 21 reaching a preset value will cause the integrate pulse i to cease. The Q output of bistable circuit 803 is connected to an inhibit input on the monostable circuit 807 so that the monostable circuit 807 will not produce an output pulse to clock the bistable circuit 803 if the integration has been completed, and hence the bistable circuit 803 is reset via line 707, before the end of the reference or sample period, times T2 and T4.

The output of reference level comparator 706 on line 707 is connected via an invertor 808 to an input of a NAND gate 809 the other input of which is connected via line 708 to the output of the energy level comparator 708. The output of NAND gate 809 is connected via an invertor 810 to an output line 811. Thus waveforms h and l are combined in NAND gate 809 to produce a sample and hold pulse m whose pulse length is proportional to the output of the squaring circuit 704 and hence proportional to the square of the energy received by the detector D during the period T2 i.e. when radiation passing through the reference cell falls on the detector.

The output of NOR gate 806 also resets bistable circuit 802 at the start of periods T2 and T4 and is applied to one input of a NAND gate 812 the other input of which is connected to the output of bistable circuit 802. The output of NAND gate 812 is connected to an invertor 813. The output of NAND gate 809 is connected to an invertor 814 which is in turn connected to an invertor 815. The outputs of invertors 813 and 815 are joined in common and fed to an output line 816 via which the zero clamp signal, waveform f, is connected to the integrators 20 and 21 of FIG. 2. Thus the zero clamp signal only occurs in the intervals between periods T2 and T3 and T4 and T1.

In an alternative embodiment the signals representing the level of the radiation falling on the detector during each of the periods T1 to T4 may be measured by an integrating digital voltmeter and stored. The differences and ratio of Sample-Dark to Ref-Dark may then be calculated in an arithmetic unit. The response time can be varied by taking the average of the results over a period which is made dependent on the magnitude of the signal during period T2. If this technique is used it would also be possible to weight the significance given to the measured results during the period over which the average is taken, e.g. to give greater significance to the latest measurements.

Further the sample-dark and ref-dark signals can then be computed in the arithmetic unit of a central processor and the signals representing the dark levels averaged over any desired number of cycles. It would then be possible to weight the significance given to the measured dark signal magnitude to take into account the effect of changes other than in the immediately adjacent dark periods.

We claim:
1. A dual beam spectrophotometer comprising
   a radiation source providing two separate radiation paths with a first radiation path passing through a sample cell and a second radiation path passing through a reference cell,
   means receiving radiation from said two radiation paths for forming alternative radiation pulses and dark periods,
   detector means receiving interlaced radiation pulses separated by said dark periods, wherein radiation following said first and second paths is prevented from falling on said detector means, for forming signals representative of the magnitude of radiation received by said detector means, and
   signal processing circuitry means receiving said signals from said detector means for generating a first signal representative of radiation in said first path minus background radiation and a second representative of radiation in said second path minus background radiation,
   wherein a signal provided by said detector means during successive dark periods is averaged, and wherein the average value is substracted from signals produced by said detector means when radiation is passed through said first and second paths so as to produce said first and second signals respectively.
2. A dual beam spectrophotometer according to claim 1, wherein the average is taken over two dark periods.
3. A dual beam spectrophotometer comprising
   a radiation source providing two separate radiation paths with a first radiation path passing through a sample cell and a second radiation path passing through a reference cell, means receiving radiation from said two radiation paths for forming alternative radiation pulses and dark periods, detector means receiving interlaced radiation pulses separated by said dark periods, wherein radiation following said first and second paths is prevented from falling on said detector means, for forming signals representative of the magnitude of radiation received by said detector means, and signal processing circuitry means receiving said signals from said detector means for generating a first signal representative of radiation in said first path minus background radiation and a second signal representative of radiation in said second path minus background radiation, wherein a signal provided by said detector means during successive dark periods is averaged over two dark periods, and wherein the average value is substracted from signals produced by said detector means when radiation is passed through said first and second paths so as to produce said first and second signals respectively, said signal processing circuitry means comprising four sample and hold circuits, wherein a first sample and hold circuit stores a signal representative of radiation passing in said first path, a second sample and hold circuit stores a signal representative of radiation passing in said second path, and third and fourth sample and hold circuits store signals representative of radiation received during successive dark periods, averaging means for averaging outputs of said third and fourth sample and hold circuits, a first substractor circuit having a first input connected to an output of said first sample and hold circuit and a second input connected to an output of said averaging means, and a second substractor circuit having a first input connected to an output of said second sample and hold circuit and a second input connected to an output of said averaging means, wherein outputs of said first and second subtractors are said first and second signals respectively.

4. A dual spectrophotometer according to claim 3, wherein said averaging means includes a resistor network.

* * * * *